M. L. J. GIRDANY.
EAR RING.
APPLICATION FILED SEPT. 28, 1909.
943,186.
Patented Dec. 14, 1909.
Fig. 1.
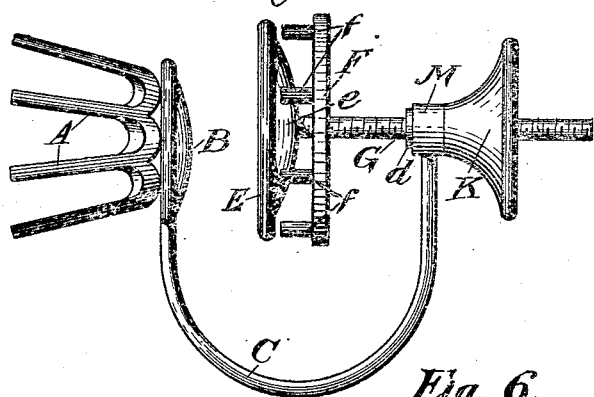
Fig. 2.
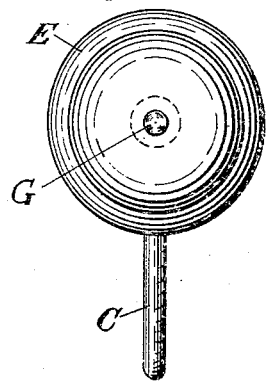
Fig. 6.
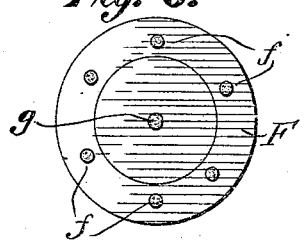
Fig. 5. Fig. 3. Fig. 4.
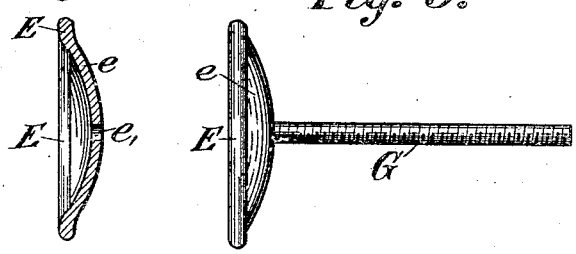
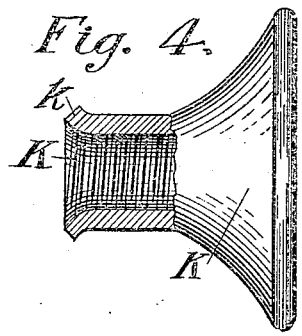
Witnesses:
Robert D. Steel
John H. Alexander
Inventor:
Morris L. J. Girdany

UNITED STATES PATENT OFFICE.

MORRIS L. J. GIRDANY, OF NEW YORK, N. Y.

EAR-RING.

943,186.  Specification of Letters Patent.  Patented Dec. 14, 1909.

Original application filed June 3, 1908, Serial No. 436,507. Divided and this application filed September 28, 1909. Serial No. 520,010.

*To all whom it may concern:*

Be it known that I, MORRIS L. J. GIRDANY, of New York city, in the county of New York and State of New York, have invented certain new and useful Improvements in Ear-Rings, of which the following is a specification.

My invention relates to improvements in ear ornaments which are fastened to the ears by means of a friction gripping device (instead of by holes in the ears and hooks or rings) in such a way and by such means as will make possible a firm, secure, strong, and locked grip without injuring or tearing the skin of the ears due to the turning of the movable grip either accidentally or intentionally while adjusting the ornament sesurely to the ear. I attain these objects by the mechanism illustrated in the accompanying drawings, in which—

Figure 1, is a side elevation of an ear ornament showing gripping device operated by means of a revolving nut and traveling screw, grip strengthening device, and setting for stone. Fig. 2, an end elevation. Fig. 3, a side elevation of the traveling screw and grip. Fig. 4, a side elevation of the revolving nut showing the nut itself in section. Fig. 5, a section through center of gripping disk E. Fig. 6, an end elevation of the movable grip mechanism with the gripping disk detached.

Similar letters refer to similar parts throughout the several views.

The setting for jewels or stones A, the stationary grip B, the looped wire C, and the nut bearing or sleeve M, constitute the ear ornament; and the traveling screw G, the ear grip E, and the revolving nut K, the gripping device.

The grip reinforcing device consists of the disk F which carries the lugs $f$ and is strongly and securely fastened to the screw G in such a position that the ends of the lugs $f$ just clear the rim of the grip E so that the gripping disk E when it is applied to an irregular surface will be prevented from being forced out of the vertical and also from bending or loosening its attachment to the screw G.

The operation of the instrument is as follows:—The lobe of the ear is inserted in the opening between the stationary grip B and the movable grip E. The width of the opening may then be lessened, thereby gripping the ear, by turning the revolving nut K and causing the screw G and grip E to travel.

When any portion of the periphery of the grip E strikes the irregular surface of the ear, any further pressure on this grip tends to throw it out of vertical and injure the joint at $e^1$ and this is prevented by the lugs $f$ which prevent any movement from the vertical of the rim of the disk E.

I therefore do not intend to claim such a combination broadly; but,

What I do intend to claim as my invention and desire to secure by Letters Patent, is:—

1. An earring consisting of the combination of a jewel setting connected with a sleeve by means of a loop of metal, said sleeve having a nut free to revolve therein said nut having shoulders to prevent it from working out of the sleeve, and a screw carrying a gripping disk on its inner end said screw being capable of travel back and forth by turning the nut through which it works, substantially as described.

2. In an earring, the combination of a screw, an ear gripping disk attached to the end of the screw, and a revolving nut through which the screw works, and a reinforcing disk attached to the screw and having lugs or pins attached to one face of it, substantially as described.

In testimony whereof I have affixed my signature, in presence of two witnesses.

MORRIS L. J. GIRDANY.

Witnesses:
ROBERT B. STEELE,
JOHN H. ALEXANDER.